United States Patent
Kern

(10) Patent No.: US 8,665,610 B2
(45) Date of Patent: Mar. 4, 2014

(54) MODIFIED ZERO VOLTAGE TRANSITION (ZVT) FULL BRIDGE CONVERTER AND PHOTOVOLTAIC (PV) ARRAY USING THE SAME

(75) Inventor: Gregory A. Kern, Lafayette, CO (US)

(73) Assignee: Greenray Inc., Westford, MA (US)

( * ) Notice: Subject to any disclaimer, the term of this patent is extended or adjusted under 35 U.S.C. 154(b) by 485 days.

(21) Appl. No.: 12/889,948

(22) Filed: Sep. 24, 2010

(65) Prior Publication Data

US 2011/0080756 A1  Apr. 7, 2011

Related U.S. Application Data

(60) Provisional application No. 61/277,510, filed on Sep. 25, 2009.

(51) Int. Cl.
*H02M 3/335* (2006.01)

(52) U.S. Cl.
USPC .............................. 363/17; 323/906

(58) Field of Classification Search
USPC ................ 323/906; 363/17, 98, 132
See application file for complete search history.

(56) References Cited

U.S. PATENT DOCUMENTS

| | | | |
|---|---|---|---|
| 6,057,665 A * | 5/2000 | Herniter et al. | 320/101 |
| 6,611,444 B2 | 8/2003 | Ayyanar et al. | |
| 7,158,395 B2 | 1/2007 | Deng et al. | |
| 8,279,649 B2 * | 10/2012 | Esram et al. | 363/132 |
| 8,284,574 B2 * | 10/2012 | Chapman et al. | 363/41 |
| 2005/0180175 A1 * | 8/2005 | Torrey et al. | 363/17 |
| 2008/0298087 A1 * | 12/2008 | Mozipo et al. | 363/17 |
| 2011/0026282 A1 * | 2/2011 | Chapman et al. | 363/65 |
| 2011/0080756 A1 * | 4/2011 | Kern | 363/17 |

OTHER PUBLICATIONS 20.1.1 The Zero-Voltage Transition Full-Bridge Converter, pp. 2-5.

* cited by examiner

*Primary Examiner* — Jeffrey Sterrett
(74) *Attorney, Agent, or Firm* — Armstrong Teasdale LLP

(57) ABSTRACT

The present invention, a modified zero voltage transition (ZVT) full bridge converter, is an isolated dc/dc converter which can operate with high efficiency and high reliability in applications requiring a low input voltage and high output voltage.

11 Claims, 2 Drawing Sheets

MODIFIED ZERO VOLTAGE TRANSITION (ZVT) FULL BRIDGE CONVERTER AND PHOTOVOLTAIC (PV) ARRAY USING THE SAME

REFERENCE TO PENDING PRIOR PATENT APPLICATION

This patent application claims benefit of pending prior U.S. Provisional Patent Application Ser. No. 61/277,510, filed Sep. 25, 2009 by Gregory Kern for MODIFIED ZERO VOLTAGE TRANSITION FULL BRIDGE CONVERTER, which patent application is hereby incorporated herein by reference.

FIELD OF THE INVENTION

This invention relates to power converters and photovoltaic (PV) arrays in general, and more particularly to switch mode power converters and photovoltaic (PV) arrays, and even more particularly to soft switching isolated power converters and photovoltaic (PV) arrays.

BACKGROUND OF THE INVENTION

A zero voltage transition (ZVT) full bridge converter is a well known dc/dc switch mode converter that can be controlled such that the switching elements in the full bridge, typically mosfets or igbts, are turned on under zero voltage conditions. More particularly, and looking now at FIG. 1, there is shown a conventional zero voltage transition (ZVT) full bridge converter 1. Conventional ZVT full bridge converter 1 consists of an input capacitor 2 followed by an array of switching devices 4, 6, 8, 10 arranged in a full bridge configuration, the output of the full bridge is then connected through an optional primary inductor 12 in series with a high frequency transformer 14, the output of the high frequency transformer 14 is then rectified by diodes 16, 18, 20, 22 in either a full bridge configuration or a center tapped configuration, and the rectified output is then filtered by an output inductor 24 and a storage capacitor 26.

Looking next at FIGS. 1 and 2, the conventional ZVT full bridge converter 1 is controlled by the use of two control signals 36, 38 which control operation of switching devices 4, 6, 8, 10. Each control signal is a high frequency square wave 32/34, typically 10 KHz to 300 KHz, operating at a fixed 50% duty cycle. Power conversion is controlled by adjusting the phase angle ("phi"), 28, between the two signals. Minimum or zero power occurs when phi is 0 degrees, so that both control signals are precisely in phase and the full bridge output is zero volts.

The ZVT full bridge converter may be run in discontinuous conduction mode (DCM), continuous conduction mode (CCM) or critical conduction mode (CrCm). Discontinuous conduction mode (DCM) is a mode of operation where the main inductor current returns to zero in each switching cycle. Continuous conduction mode (CCM) is a mode of operation where the main inductor current does not return to zero in each switching cycle. Critical conduction mode (CrCM) is right at the cusp of the two aforementioned conduction modes.

The conventional ZVT full bridge converter 1 of FIG. 1 is typically used to convert from a high voltage (e.g., 100 to 400 volts dc) down to a lower output voltage (e.g., <50 volts dc), with isolation between the input and output.

The conventional ZVT full bridge converter 1 of FIG. 1 is NOT well suited to the reverse situation where the input voltage is low and the output voltage is high. This is because in this low input/high output situation, the voltage stresses on the output diodes 16, 18, 20, 22 are significant. Ringing voltages occur on the output diodes 16, 18, 20, 22 that are large and difficult to snub, forcing the circuit designer to use output diodes rated for voltages much higher than the output voltage of the converter. Furthermore, when the output voltage is high, the output inductor 24 is not well utilized, since it is located at a point in the circuit where current is relatively low.

The primary inductor 12 is considered optional in a conventional ZVT full bridge converter, and may be included if additional primary inductance is desired. The primary inductor 12 adds to the leakage inductance of the transformer 14. Leakage inductance of the transformer is frequently beneficial in the operation of the converter, and limits large current spikes from passing through the transformer, and also aids in zero voltage transition operation of the converter.

In photovoltaic (PV) array applications, it is frequently desired to convert from a low voltage (e.g., <50 volts dc) up to a higher voltage (e.g., >200 volts dc), with isolation between input and output. Photovoltaic (PV) array applications typically also call for high reliability, high efficiency and low cost.

In view of the foregoing, it will be appreciated that a conventional ZVT full bridge converter (e.g., the conventional ZVT full bridge converter 1 of FIG. 1) is not well suited for use with a photovoltaic (PV) array application, since the use of a conventional ZVT full bridge converter in a low input/high output conversion creates reliability issues for the output diodes, and results in poor inductor utilization and lower efficiency.

Thus there is a need for a new and improved zero voltage transition (ZVT) full bridge converter which allows for improved operation in applications requiring high voltage output, and particularly for use in photovoltaic (PV) array applications.

SUMMARY OF THE INVENTION

The present invention comprises the provision and use of a novel modified zero voltage transition (ZVT) full bridge converter which allows for improved operation in applications needing high voltage output. The novel modified zero voltage transition (ZVT) full bridge converter of the present invention is generally similar to the conventional ZVT full bridge converter of FIG. 1, except that the output inductor 24 of the conventional ZVT full bridge converter is eliminated from the output circuit of the modified ZVT full bridge converter, which is what makes this a "modified" ZVT full bridge converter. The ramifications of this design change are that the voltage stress on the output diodes 16, 18, 20, 22 is well controlled because of the clamping action of the output capacitance of storage capacitor 26. Because the output of this converter is high voltage, e.g., 200 to 400 Vdc, 600 V rated diodes can be used. However, if the output inductor 24 were included in the modified ZVT full bridge converter (i.e., as is the case with the conventional ZVT full bridge converter of FIG. 1), then the voltage stress on the output diodes 16, 18, 20, 22 is not well controlled, and is in fact determined more by the input voltage to the converter, the turns ratio of the transformer and parasitic inductances and capacitances in the circuit, as well as the operating mode of the converter.

Eliminating the output inductor 24 from the modified ZVT full bridge converter, and designing the converter to fully utilize the input inductor 12, has the following significant advantages.

First, the input inductor 12 is better utilized. The energy stored in an inductor is proportional to $L*I^2$, and the size and cost of an inductor is typically proportional to L*I, therefore inductors are more efficiently utilized at low voltage where currents are high rather than at high voltage where currents are low.

Second, elimination of output inductor 24 forces the converter to operate in discontinuous conduction mode (DCM) or critical conduction mode (CrCM), but definitely NOT in continuous conduction mode (CCM). DCM and CrCM modes generally have higher conversion efficiencies and lower radiated emissions and are believed to be preferential modes of operation for photovoltaic (PV) applications.

Third, elimination of output inductor 24 allows the voltage stress on the output diodes to be clamped by the output capacitance of storage capacitor 26, which is beneficial for reliability and cost reasons.

Photovoltaic (PV) applications typically call for high reliability, high efficiency and low cost. These objectives are usually counter to each other and tradeoffs must be made. The modified zero voltage transition (ZVT) full bridge converter of the present invention is preferred over the conventional ZVT full bridge converter of FIG. 1 for photovoltaic (PV) applications, where isolation is desired between input and output and where a voltage boost from low voltage to high voltage (e.g., 200 to 400 Vdc) is also desired, since the modified ZVT full bridge converter provides improved reliability of the output diodes, better inductor utilization, and high efficiency.

In addition to the foregoing, when operating in discontinuous conduction mode (DCM), there is a period in which the waveform at the output of the full bridge (of switching devices 4, 6, 8, 10) is ringing. If one wishes to maximize efficiency, such as is the case in photovoltaic (PV) applications where high efficiency is desired, then the best time to turn on the switching elements is when the voltage across the switching element is nearest zero. This can be accomplished by adding specific controls that seek out these low voltage points in the waveform. However, this approach has the disadvantage of adding to the complexity of the electronics. As an alternative, and in accordance with the present invention, the modified ZVT full bridge converter may be provided with a power tracking module which monitors the output of the converter, and dynamically adjusts the phase of the two control signals 36, 38, so as to find the most efficient operating point for the converter. In other words, the power tracking module monitors the output power of the converter, and dynamically adjusts the timing of the two control signals of the converter, in a feedback loop arrangement, so as to maximize the total output power of the converter (rather than adjusting the total input power to the converter or sensing the ringing waveform of the full bridge output via the use of additional voltage controls). In this way, the more efficient operating points of the dc/dc converter are naturally found.

In one preferred form of the present invention, there is provided a modified zero voltage transition (ZVT) full bridge converter consisting of:
a pair of input lines;
a pair of output lines;
an input capacitor spanning the pair of input lines;
an array of switching devices, arranged in a full bridge configuration, spanning the pair of input lines after the input capacitor;
a pair of control lines connected to the array of switching devices;
an inductor in series with the primary of a transformer, the free lead of the inductor and the free lead of the primary of the transformer being connected to the output of the array of switching devices;
a diode rectifier connected to the secondary of, the transformer, the output of the diode rectifier being connected to the pair of output lines; and
an output capacitor spanning the pair of output lines.

In another preferred form of the present invention, there is provided a power system comprising:
a photovoltaic (PV) array having an output;
a zero voltage transition (ZVT) full bridge converter connected to the output of the photovoltaic (PV) array, the zero voltage transition (ZVT) full bridge converter comprising a pair of control lines for controlling operation of the zero voltage transition (ZVT) full bridge converter; and
a power tracking module connected to the output of the zero voltage transition (ZVT) full bridge converter and to the pair of control lines, wherein the power tracking module is configured to adjust the signals applied to the pair of control lines based on the output of the zero voltage transition (ZVT) full bridge converter so as to optimize the output of the zero voltage transition (ZVT) full bridge converter.

In another preferred form of the present invention, there is provided a method for converting voltage, comprising:
providing a modified zero voltage transition (ZVT) full bridge converter, the modified zero voltage (ZVT) full bridge converter consisting of:
a pair of input lines;
a pair of output lines;
an input capacitor spanning the pair of input lines;
an array of switching devices, arranged in a full bridge configuration, spanning the pair of input lines after the input capacitor;
a pair of control lines connected to the array of switching devices;
an inductor in series with the primary of a transformer, the free lead of the inductor and the free lead of the primary of the transformer being connected to the output of the array of switching devices;
a diode rectifier connected to the secondary of the transformer, the output of the diode rectifier being connected to the pair of output lines; and
an output capacitor spanning the pair of output lines;
applying a voltage to the pair of input lines; and
applying signals to the pair of control lines so as to control the output voltage of the pair of output lines.

In another preferred form of the present invention, there is provided a method for generating power, comprising:
providing a power system comprising:
a photovoltaic (PV) array having an output;
a zero voltage transition (ZVT) full bridge converter connected to the output of the photovoltaic (PV) array, the zero voltage transition (ZVT) converter comprising a pair of control lines for controlling operation of the zero voltage transition (ZVT) full bridge converter; and
a power tracking module connected to the output of the zero voltage transition (ZVT) full bridge converter and to the pair of control lines, wherein the power tracking module is configured to adjust the signals applied to the pair of control lines based on the output of the zero voltage transition (ZVT) full bridge converter so as to optimize the output of the zero voltage transition (ZVT) full bridge converter; and
applying signals to the pair of control lines so as to control the output voltage on the pair of output lines.

BRIEF DESCRIPTION OF THE DRAWING

These and other objects and features of the present invention will be more fully disclosed or rendered obvious by the following detailed description of the preferred embodiments of the invention, which is to be considered together with the accompanying drawings wherein like numbers refer to like parts, and further wherein:

FIG. 1 is a schematic diagram of a conventional zero voltage transition (ZVT) full bridge converter.

DETAILED DESCRIPTION OF THE PREFERRED EMBODIMENTS

Figure 3:
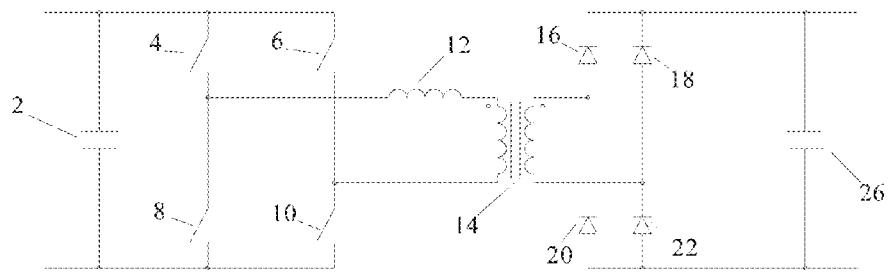
FIG. 3 is a schematic diagram of the modified zero voltage transition (ZVT) full bridge converter of the present invention.

Looking next at FIG. 3, there is shown a modified zero voltage transition (ZVT) full bridge converter 1A formed in accordance with the present invention. Modified ZVT full bridge converter 1A consists of an input capacitor 2, full bridge configuration of switching elements 4, 6, 8, 10, a primary inductor 12, a transformer 14, a full bridge configuration of output diodes 16, 18, 20, 22, and an output capacitor 26.

In accordance with the present invention, the output inductor 24 of the conventional ZVT full bridge converter 1 (FIG. 1) is deliberately omitted from the modified ZVT full bridge converter 1A (FIG. 3) of the present invention.

In more detail, and still referring to FIG. 3, the modified ZVT full bridge converter 1A of the present invention transfers electrical energy from the input capacitor 2 to the output capacitor 26. This transfer of energy is done through a transformer 14 which provides electrical isolation between the input circuit (i.e., circuit elements 2, 4, 6, 8, 10, 12) and the output circuit (i.e., circuit elements 16, 18, 20, 22, 26). The amount of energy transferred across the converter is dependant upon the timing sequence of the switching elements 4, 6, 8, 10.

Figure 2:
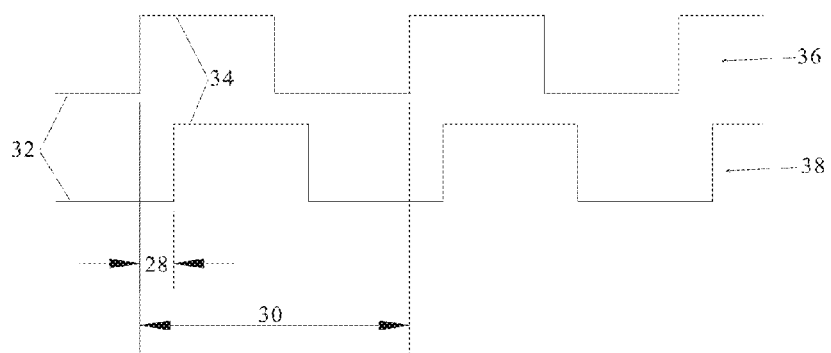
FIG. 2 is a timing diagram of the switching sequence for a zero voltage transition (ZVT) full bridge converter.

Referring now to the timing diagram of FIG. 2, there are two control signals 36, 38. In the timing diagram of FIG. 2, the horizontal axis represents time. Both control signals 36, 38 operate at a fixed 50% duty cycle where the time spent at the high level 34 equals the time spent at the low level 32. The amount of energy transferred during each cycle is dependant upon the phase time 28 divided by the period time 30. The first control signal 36 controls operation of the switching elements 4, 8 in the first leg of the full bridge, such that when the first control signal 36 is at the high level 34, switch element 4 is closed and switch element 8 is open, and when the first control signal 36 is at the low level 32, switch element 4 is open and switch element 8 is closed. The second control signal 38 controls operation of the switching elements 6, 10 in the second leg of the full bridge, such that when the first control signal 36 is at the high level 34, switch element 6 is closed and switch element 10 is open, and when the second control signal 38 is at the low level 32, switch element 6 is open and switch element 10 is closed. Thus, when the phase time 28 is zero, both control signals 36, 38 are perfectly in phase and the voltage applied to the inductor 12 and transformer 14 are zero. When the phase time 28 is one-half of the period time 30, then the two control signals 36, 38 are perfectly out of phase and the voltage applied to the inductor 12 and transformer 14 would be a maximum ac voltage.

This type of control is typically called phase control. It is usually done at fixed frequency but could also include variable frequency. Power delivery is controlled by adjusting the phase angle between the two control signals 36, 38. It is important to only apply an ac voltage to the transformer and not a dc voltage, this can be achieved by using digital control to ensure that the duty cycle of each control signal is equal.

When the first control signal 36 is high (34) and the second control signal 38 is low (32), then a positive voltage is applied across the inductor 12 and the primary of transformer 14. During this time, the inductor current increases and becomes more positive. Because the current into the transformer is going into the dot, current will be coming out of the dot in the secondary of the transformer. This output current will force output diodes 16 and 22 to conduct, causing a positive voltage to be applied to the secondary of the transformer. As long as the inductor current is positive, the voltage applied to the transformer secondary will be positive. Then when both control signals 36, 38 are high (34), switch elements 4 and 6 are on, but the inductor current is still positive but now decreasing. When the inductor current reaches zero, then all of the output diodes 16, 18, 20, 22 will turn off.

Similar operation occurs for negative inductor current during the other half of the switching cycle, i.e., when the first control signal 36 is low (32) and the second control signal 38 is high (34).

Still referring to the modified ZVT full bridge converter 1A of FIG. 3, the input capacitor 2 is sized to filter the switching frequency current pulses of the full bridge input stage. This input capacitor 2 needs to have good high frequency characteristics and may be composed of multiple capacitors in parallel. If high efficiency and high reliability operation is desired, then a combination of metal film and ceramic capacitors may be used for input capacitator 2. The switching elements 4, 6, 8, 10 are preferably N channel mosfets, but other types of switching elements may be used (e.g., igbts). These switching elements 4, 6, 8, 10 must be controlled such that elements 4 and 8 can never be on at the same time as one another, and elements 6 and 10 also may never be on at the same time as one another, otherwise large shoot-through currents would occur, leading to high emi and low reliability. It is, however, well known in the field how to achieve such control and so this aspect of the device is not addressed in the present disclosure. The input inductor 12 operates with both positive and negative currents and with a zero dc bias. This input inductor 12 may be eliminated if the transformer 14 can be designed with a controlled leakage inductance equal to the desired inductance of input inductor 12. The current waveform for the input inductor 12 is substantially triangular in shape. The input inductor 12 will see peak currents on the order of 3 to 4 times the dc input current to the converter, so the input inductor 12 needs to be designed for high efficiency under high ac flux conditions. The transformer 14 is a high frequency transformer and is designed to have a turns ratio of 1:N from input to output. Under all operating conditions, the output voltage will be less than the input voltage times N. The ratio of turns from input to output gives the desired voltage boost feature even though the overall converter is a form of isolated buck converter. The output diodes 16, 18, 20, 22 rectify the output current of the transformer 14 and feed that current into the output capacitor 26 to form a positive output voltage. The voltage stress on the output diodes 16, 18, 20, 22 is equal to the output voltage of the converter. The output diodes 16, 18, 20, 22 need to be rated for the peak current of inductor 12 divided by N and ½ the converter output average current as well as the output voltage rating. The output capacitor 26 filters the pulses of current coming from the transformer 14 and deliver a dc voltage to the load.

In one preferred form of the modified ZVT full bridge converter 1A of FIG. 3, the input capacitor is a 7.5 uF 300V metallized film capacitor, the switching elements 4, 6, 8, 10 are Infineon IPP08CN10NG mosfets, and the inductor 12 is rated for 5.3 uH and 20 A peak with a dc resistance of 0.009 ohms. The inductor 12 preferably has 10 turns of Litz wire. (57 strands of No. 34 awg) on a magnetics inc torroidal core 77550-A7. The transformer 14 is a magnetics inc core ZF-43615-TC, where the primary has 11 turns composed of Litz wire, and the secondary has 99 turns of Rubadue TCA3 No. 19 wire, with a primary dc resistance of 0.004 ohms and a secondary dc resistance of 0.141 ohms, the primary is wound second as a simple wind with no overlap, and the secondary is about 3 layers wound first over the core. The output diodes 16, 18, 20, 22 are Cree CSD02060 diodes rated for 2 amps and 600 volts. The output capacitor 26 is made up of three capacitors in parallel from AVX, part no. FFB46A0755K rated for 7.5 uF 720 V each, for a net output capacitance of 22.5 uF.

The specific construction details of the present invention can be modified without departing from the scope of the invention. For example, the inductor 12 can be incorporated into the design of the transformer 14 by designing the transformer leakage inductance to equal the desired inductor inductance. The output diodes 16, 18, 20, 22 do not have to be cree type diodes, since they operate under the soft switching conditions of the converter and may be any reasonable type of switching diode. The input and output capacitors 2 and 26, respectively, do not have to be film capacitors: electrolytic capacitors or nearly any other type capacitor may be used. Film capacitors were used in the preferred construction for high reliability and efficiency purposes. Other constructions for the inductor 12 and transformer 14 may be used as would be known by those well versed in the art in view of the present disclosure. Switching elements 4, 6, 8, 10 may be other than mosfets, e.g., they may be IGBTs.

Figure 1:
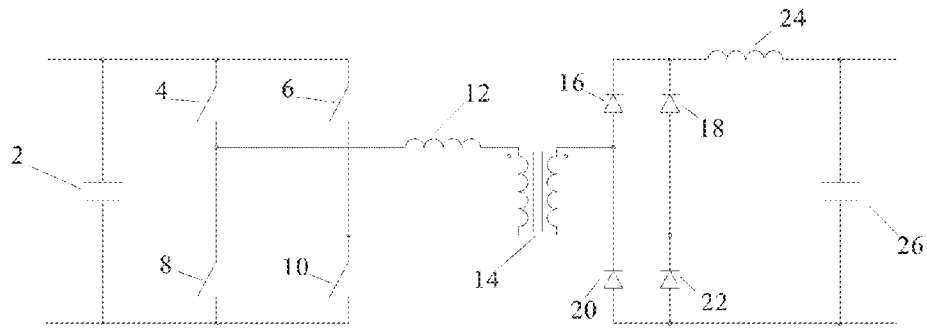

The advantages of the modified ZVT full bridge converter of the present invention include, without limitation, higher reliability and efficiency than the conventional ZVT full bridge converter shown in FIG. 1. This is because the voltage stresses on the output diodes 16, 18, 20, 22 are clamped by the output capacitor 26 and this becomes important in applications where the input voltage is low and the output voltage is high, e.g., photovoltaic (PV) applications. Also, soft switching can be achieved over a wide range of operating points, wider than in either a series resonant or parallel resonant converter. All switching devices 4, 6, 8, 10 in the modified ZVT full bridge converter of the present invention have voltages clamped by either the input or output capacitors 2 or 26, respectively, with minimal ringing waveforms. This leads to potentially higher reliability than alternative designs. Only a minimum of RC snubbers are needed to clean up the voltage waveforms on the switching elements. The output voltage and current waveforms from the secondary of the transformer 14 are very clean, minimizing the amount of conducted emi that would pass through to the load.

In a broad sense, the present invention is an isolated dc/dc converter which operates with high efficiency and high reliability in applications requiring a low input voltage and high output voltage.

In addition to the foregoing, and as noted above, when operating in discontinuous conduction mode (DCM), there is a period in which the waveform at the output of the full bridge (of switching devices 4, 6, 8, 10) is ringing. If one wishes to maximize efficiency, such as is the case in photovoltaic (PV) applications where high efficiency is desired, then the best time to turn on the switching elements is when the voltage across the element is nearest zero. As also noted above, this can be accomplished by adding specific controls that seek out these low voltage points in the waveform. However, this approach has the disadvantage of adding to the complexity of the electronics for sensing this condition. As an alternative, and in accordance with the present invention, the modified ZVT full bridge converter may be provided with a power tracking module which monitors the output of the converter, and dynamically adjusts the phase of the two control signals 36, 38, so as to find the most efficient operating point for the converter. In other words, the power tracking module monitors the output of the converter, and dynamically adjusts the timing of the two control signals of the converter, in a feedback loop arrangement, so as to maximize the total output power of the converter (rather than adjusting the total input power to the converter via the use of additional voltage controls). In this way, the more efficient operating points of the dc/dc converter are naturally found.

Figure 4:
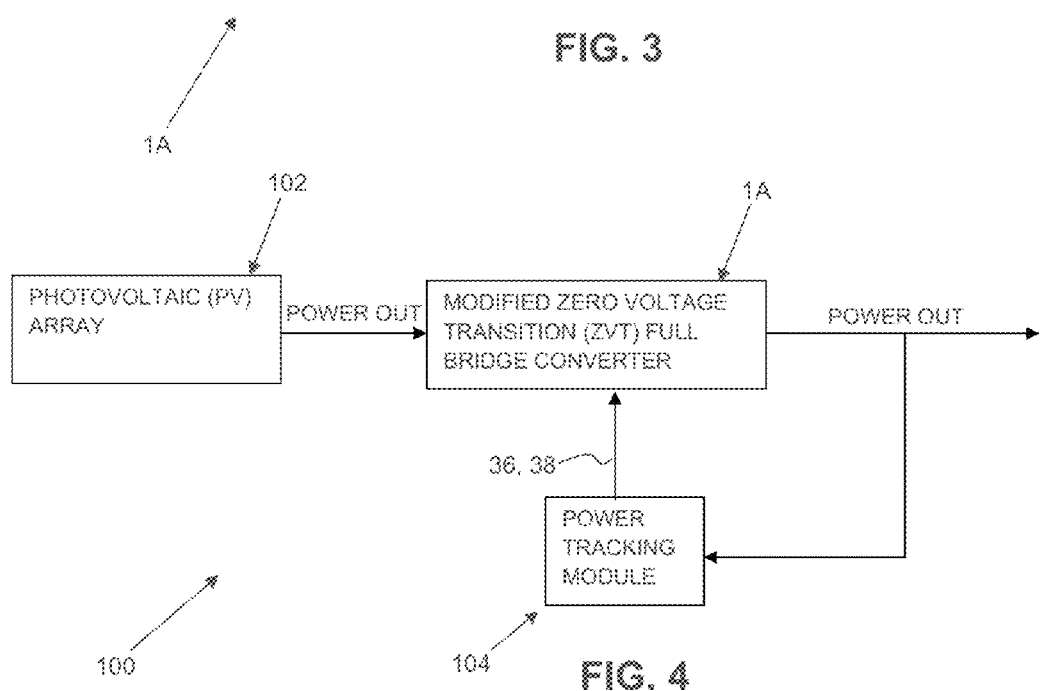
FIG. 4 is a schematic diagram of a modified zero voltage transition (ZVT) full bridge converter being used in conjunction with a photovoltaic (PV) array, wherein the modified ZVT full bridge converter is equipped with a power tracking module.

Thus, and looking next at FIG. 4, there is shown a power system 100 which comprises a photovoltaic (PV) array 102 which has its output connected to a modified zero voltage transition (ZVT) full bridge converter 1A which converts a low voltage input (e.g., <50 volts dc) up to a higher voltage (e.g., >200 volts dc), with isolation between the input and the output. The output power of the modified ZVT full bridge converter 1A is tracked by a power tracking module 104. Power tracking module 104 monitors the output power of the modified ZVT full bridge converter and dynamically adjusting the timing of the two control signals 36, 38 so as to maximize the total output power of the converter.

While the foregoing written description of the invention enables one of ordinary skill in the art to make and use what is considered presently to be the best mode thereof, those of ordinary skill in the art will understand and appreciate the existence of variations, combinations, and equivalents of the specific embodiments, methods, and examples herein. The invention should therefore not be limited by the above described embodiments, methods, and examples, but by all embodiments and methods within the spirit and scope of the present invention.

What is claimed is:

1. A modified zero voltage transition (ZVT) full bridge converter comprising:
    a pair of input lines;
    a pair of inductorless output lines;
    an input capacitor spanning the pair of input lines;
    an array of switching devices, arranged in a full bridge configuration, spanning the pair of input lines after the input capacitor;
    a transformer comprising a primary and a secondary, the primary of the transformer being connected to an output of the array of switching devices;
    a diode rectifier connected to the secondary of the transformer, the output of the diode rectifier being connected to the pair of inductorless output lines;
    and an output capacitor spanning the pair of inductorless output lines.

2. A modified ZVT full bridge converter according to claim 1 wherein the diode rectifier comprises a full bridge configuration.

3. A modified ZVT full bridge converter according to claim 1 further comprising an inductor in series with the primary of the transformer, wherein a free lead of the inductor and a free lead of the primary of the transformer are connected to the output of the array of switching devices.

4. A power system comprising:
a photovoltaic (PV) array having an output;
a zero voltage transition (ZVT) full bridge converter connected to the output of the PV array, the ZVT full bridge converter comprising a plurality of switches defining a first leg of a full bridge and a second leg of the full bridge; and
a power tracking module connected to the ZVT full bridge converter, wherein the power tracking module is configured to control a phase relationship between a first control signal and a second control signal provided to the plurality of switches based on an output power of the ZVT full bridge converter.

5. A power system according to claim 4 wherein the ZVT full bridge converter is a conventional ZVT full bridge converter.

6. A power system according to claim 4 wherein the zero voltage transition (ZVT) full bridge converter is a modified ZVT full bridge converter.

7. A power system according to claim 6 wherein the modified ZVT full bridge converter comprises:
a pair of input lines;
a pair of inductorless output lines;
an input capacitor spanning the pair of input lines;
an array of switching devices, arranged in a full bridge configuration, spanning the pair of input lines after the input capacitor;
a transformer comprising a primary and a secondary, the primary of the transformer being connected to an output of the array of switching devices;
a diode rectifier connected to the secondary of the transformer, the output of the diode rectifier being connected to the pair of inductorless output lines; and
an output capacitor spanning the pair of inductorless output lines.

8. A method for converting voltage, comprising:
providing a modified zero voltage transition (ZVT) full bridge converter, the modified ZVT full bridge converter consisting of:
a pair of input lines;
a pair of inductorless output lines;
an input capacitor spanning the pair of input lines;
an array of switching devices, arranged in a full bridge configuration, spanning the pair of input lines after the input capacitor;
a transformer comprising a primary and a secondary, the primary of the transformer being connected to an output of the array of switching devices;
a diode rectifier connected to the secondary of the transformer, an output of the diode rectifier being connected to the pair of inductorless output lines; and
an output capacitor spanning the pair of inductorless output lines;
applying a voltage to the pair of input lines; and
selectively switching the array of switching devices to control an output voltage on the pair of inductorless output lines.

9. A method according to claim 8, wherein the modified ZVT full bridge converter further comprises an inductor in series with the primary of the transformer, and wherein a free lead of the inductor and a free lead of the primary of the transformer are connected to the output of the array of switching devices.

10. A method for generating power, comprising:
providing a power system comprising:
a photovoltaic (PV) array having an output;
a zero voltage transition (ZVT) full bridge converter connected to the output of the PV array, the ZVT full bridge converter comprising a plurality of switches defining a first leg of a full bridge and a second leg of the full bridge, and a pair of output lines; and
a power tracking module connected to the ZVT full bridge converter, wherein the power tracking module is configured to control a phase relationship between a first control signal and a second control signal provided to the plurality of switches based on an output power of the ZVT full bridge converter; and
selectively switching the array of switching devices to control an output voltage on the pair of output lines.

11. A method according to claim 10, wherein the pair of output lines comprises a pair of inductorless output lines.

* * * * *